United States Patent
Tanaka et al.

(10) Patent No.: US 12,057,570 B2
(45) Date of Patent: Aug. 6, 2024

(54) COMPOSITION FOR ELECTROCHEMICAL DEVICE FUNCTIONAL LAYER, FUNCTIONAL LAYER FOR ELECTROCHEMICAL DEVICE, AND ELECTROCHEMICAL DEVICE

(71) Applicant: ZEON CORPORATION, Tokyo (JP)

(72) Inventors: Keiichiro Tanaka, Tokyo (JP); Hiroyuki Taguchi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/636,022

(22) PCT Filed: Aug. 29, 2018

(86) PCT No.: PCT/JP2018/031971
§ 371 (c)(1),
(2) Date: Feb. 3, 2020

(87) PCT Pub. No.: WO2019/044912
PCT Pub. Date: Mar. 7, 2019

(65) Prior Publication Data
US 2020/0227712 A1     Jul. 16, 2020

(30) Foreign Application Priority Data

Aug. 31, 2017   (JP) .................................. 2017-167541

(51) Int. Cl.
| | |
|---|---|
| *H01M 4/36* | (2006.01) |
| *C08L 33/14* | (2006.01) |
| *H01M 4/62* | (2006.01) |
| *H01M 50/414* | (2021.01) |
| *H01M 50/426* | (2021.01) |
| *H01M 50/443* | (2021.01) |

(52) U.S. Cl.
CPC ............. *H01M 4/366* (2013.01); *C08L 33/14* (2013.01); *H01M 4/62* (2013.01); *H01M 50/414* (2021.01); *H01M 50/426* (2021.01); *H01M 50/443* (2021.01); *C08L 2205/025* (2013.01); *C08L 2205/03* (2013.01); *C08L 2207/53* (2013.01)

(58) Field of Classification Search
CPC ...... H01M 4/04; H01M 50/409; H01M 4/139; H01M 4/362; H01M 4/62; H01M 4/66; H01M 10/058; H01M 4/366; H01M 4/622; H01M 4/623; H01M 10/0525; H01M 50/414; H01M 50/417; H01M 50/42; H01M 50/443; H01M 50/449; H01M 4/13; H01M 50/46; H01M 50/411; H01M 50/446; H01M 50/426; H01M 50/431; Y02P 70/50; H01G 11/04; H01G 11/26; H01G 11/52; H01G 11/38; Y02E 60/10; C08L 33/14; C08L 2205/025; C08L 2205/03; C08L 2207/53

USPC ......................................................... 429/249
See application file for complete search history.

(56) References Cited

U.S. PATENT DOCUMENTS

| | | | |
|---|---|---|---|
| 6,770,397 B1 * | 8/2004 | Maeda .................. | H01M 4/622 429/217 |
| 9,620,760 B2 | 4/2017 | Kaneda | |
| 2010/0010118 A1 * | 1/2010 | Bardman .............. | C08F 265/06 523/201 |
| 2011/0189550 A1 * | 8/2011 | Zhao ................. | H01M 10/0567 429/188 |
| 2011/0239446 A1 * | 10/2011 | Morishima ......... | H01M 4/1393 29/623.5 |
| 2012/0141859 A1 * | 6/2012 | Murata ............... | H01M 50/446 428/319.3 |
| 2012/0189897 A1 * | 7/2012 | Wakizaka ........... | H01M 50/403 429/144 |
| 2015/0072213 A1 * | 3/2015 | Kaneda ................ | H01M 50/411 429/144 |
| 2016/0064773 A1 * | 3/2016 | Choi ................. | H01M 10/0565 429/313 |
| 2016/0093916 A1 * | 3/2016 | Moon ............... | H01M 10/0565 429/317 |
| 2016/0141581 A1 * | 5/2016 | Sasaki ................. | H01M 50/443 429/144 |
| 2017/0214022 A1 | 7/2017 | Sasaki | |
| 2018/0053928 A1 * | 2/2018 | Xie ..................... | H01M 50/581 |
| 2018/0114988 A1 * | 4/2018 | Yoon ..................... | H01M 4/621 |
| 2018/0327639 A1 | 11/2018 | Tanaka et al. | |
| 2018/0366731 A1 | 12/2018 | Takahashi et al. | |

FOREIGN PATENT DOCUMENTS

| | | |
|---|---|---|
| CN | 104170121 A | 11/2014 |
| EP | 1244157 A1 | 9/2002 |
| JP | 2001035496 A | 2/2001 |
| JP | 2001332265 A | 11/2001 |
| JP | 2002175806 A | 6/2002 |
| JP | 2010055847 A | 3/2010 |
| JP | 2015065141 A | 4/2015 |
| JP | 2016122611 A | 7/2016 |
| KR | 1020140144182 A | 12/2014 |
| KR | 1020160026644 A | 3/2016 |
| WO | 2017094250 A1 | 6/2017 |
| WO | 2017110901 A1 | 6/2017 |

OTHER PUBLICATIONS

Charles M. Hansen, Hansen Solubility Parameters: A User's Handbook, Second Edition, Jun. 15, 2007, CRC Press.
Oct. 9, 2018, International Search Report issued in the International Patent Application No. PCT/JP2018/031971.

(Continued)

Primary Examiner — Christian Roldan
(74) Attorney, Agent, or Firm — KENJA IP LAW PC

(57) ABSTRACT

A composition for an electrochemical device functional layer contains a polymer A and a solvent. The polymer A contained in the composition for an electrochemical device functional layer includes an alkylene oxide structure-containing monomer unit and a (meth)acrylic acid ester monomer unit.

7 Claims, No Drawings

(56) References Cited

OTHER PUBLICATIONS

Feb. 18, 2021, the Extended European Search Report issued by the European Patent Office in the corresponding European Patent Application No. 18850087.0.

Mar. 3, 2020, International Preliminary Report on Patentability issued in the International Patent Application No. PCT/JP2018/031971.

* cited by examiner

COMPOSITION FOR ELECTROCHEMICAL DEVICE FUNCTIONAL LAYER, FUNCTIONAL LAYER FOR ELECTROCHEMICAL DEVICE, AND ELECTROCHEMICAL DEVICE

TECHNICAL FIELD

The present disclosure relates to a composition for an electrochemical device functional layer, a functional layer for an electrochemical device, and an electrochemical device.

BACKGROUND

Electrochemical devices, including non-aqueous secondary batteries such as lithium ion secondary batteries, have characteristics such as compact size, light weight, high energy density, and the ability to be repeatedly charged and discharged, and are used in a wide variety of applications. In particular, a non-aqueous secondary battery (hereinafter, also referred to simply as a "secondary battery"), which is one type of electrochemical device, normally includes battery components such as electrodes (positive electrode and negative electrode) and a separator that isolates the positive electrode and the negative electrode from one another and prevents short circuiting between the positive and negative electrodes.

There are cases in which a component including a functional layer containing particles compounded in order to cause a battery component to display a desired function (hereinafter, referred to as "functional particles") and other ingredients is used as a component included in an electrochemical device.

For example, a separator including a porous membrane layer that contains a binder and non-conductive particles as functional particles on a separator substrate may be used as a separator of a secondary battery. Moreover, an electrode that includes an electrode mixed material layer containing a binder and electrode active material particles as functional particles on a current collector or an electrode that further includes a porous membrane layer such as described above, or the like, on an electrode substrate including an electrode mixed material layer on a current collector may be used as an electrode of a secondary battery.

Attempts have been made to improve compositions for functional layers in recent years with the aim of further improving the performance of secondary batteries and other electrochemical devices. In one example, Patent Literature (PTL) 1 proposes a composition for a non-aqueous secondary battery functional layer that contains a particulate polymer having specific properties and an amino acid in a specific ratio and that also contains a wetting agent such as an ethylene oxide-propylene oxide copolymer. In another example, PTL 2 proposes a technique of forming a negative electrode using a paste that contains a binder and a carbon material having, at the surface thereof, a copolymer including an ethylene oxide unit and a propylene oxide unit.

CITATION LIST

Patent Literature

PTL 1: JP 2016-122611 A
PTL 2: JP 2002-175806 A

SUMMARY

Technical Problem

However, there is room for improvement over the conventional composition or technique described above in terms of enhancing electrochemical characteristics such as low-temperature output characteristics and high-voltage cycle characteristics of an obtained electrochemical device.

Accordingly, one objective of the present disclosure is to provide a composition for an electrochemical device functional layer with which it is possible to form a functional layer that can improve low-temperature output characteristics and high-voltage cycle characteristics of an electrochemical device.

Another objective of the present disclosure is to provide a functional layer for an electrochemical device that can improve low-temperature output characteristics and high-voltage cycle characteristics of an electrochemical device.

Yet another objective of the present disclosure is to provide an electrochemical device having excellent electrochemical characteristics such as low-temperature output characteristics and high-voltage cycle characteristics.

Solution to Problem

The inventors conducted diligent investigation with the aim of solving the problem set forth above. The inventors discovered that an electrochemical device including a functional layer can be caused to display excellent low-temperature output characteristics and high-voltage cycle characteristics by forming the functional layer using a composition for an electrochemical device functional layer that contains a polymer including an alkylene oxide structure-containing monomer unit and a (meth)acrylic acid ester monomer unit, and in this manner completed the present disclosure.

Specifically, the present disclosure aims to advantageously solve the problem set forth above by disclosing a composition for an electrochemical device functional layer comprising a polymer A and a solvent, wherein the polymer A includes an alkylene oxide structure-containing monomer unit and a (meth)acrylic acid ester monomer unit. Through use of a composition for an electrochemical device functional layer that contains a polymer A including an alkylene oxide structure-containing monomer unit and a (meth)acrylic acid ester monomer unit in this manner, it is possible to obtain a functional layer that can cause an electrochemical device to display excellent low-temperature output characteristics and high-voltage cycle characteristics.

The phrase "includes a monomer unit" as used with respect to a polymer in the present disclosure means that "a polymer obtained with the monomer includes a repeating unit derived from the monomer". Also note that in the present specification, "(meth)acryl" is used to indicate "acryl" or "methacryl".

In the presently disclosed composition for an electrochemical device functional layer, it is preferable that the (meth)acrylic acid ester monomer unit includes a (meth)acrylic acid alkyl ester monomer unit, and that an alkyl group bonded to a non-carbonyl oxygen atom in the (meth)acrylic acid alkyl ester monomer unit is a linear or branched alkyl group having a carbon number of not less than 5 and not more than 20. When the (meth)acrylic acid ester monomer unit included in the polymer A includes a (meth)acrylic acid alkyl ester monomer unit in which the alkyl group bonded to the non-carbonyl oxygen atom is a linear or branched alkyl group having a carbon number of not less than 5 and not more than 20, the composition for an electrochemical device functional layer containing the polymer A can be used to form a functional layer that can cause an electrochemical device to display even better low-temperature output characteristics.

In the presently disclosed composition for an electrochemical device functional layer, the alkylene oxide structure-containing monomer unit of the polymer A preferably includes a polyalkylene oxide structure in which an alkylene oxide structural unit is repeated n times, where n is an integer of not less than 2 and not more than 30. Through use of a composition for an electrochemical device functional layer containing a polymer A that includes an alkylene oxide structure-containing monomer unit including a polyalkylene oxide structure, it is possible to form a functional layer that can cause an electrochemical device to display even better low-temperature output characteristics.

The number of repetitions n of an alkylene oxide structural unit can be determined by a method described in the EXAMPLES section of the present specification.

In the presently disclosed composition for an electrochemical device functional layer, the alkylene oxide structure-containing monomer unit of the polymer A preferably includes either or both of an ethylene oxide structure-containing monomer unit and a propylene oxide structure-containing monomer unit. When the alkylene oxide structure-containing monomer unit of the polymer A includes either or both of an ethylene oxide structure-containing monomer unit and a propylene oxide structure-containing monomer unit, the composition for an electrochemical device functional layer containing the polymer A can be used to form a functional layer that can cause an electrochemical device to display even better low-temperature output characteristics.

The presently disclosed composition for an electrochemical device functional layer preferably further comprises non-conductive particles. Through use of a composition for an electrochemical device functional layer containing non-conductive particles, it is possible to form a functional layer that can display a function resulting from these particles and that can also cause an electrochemical device to display excellent low-temperature output characteristics and high-voltage cycle characteristics.

The present disclosure also aims to advantageously solve the problem set forth above by disclosing a functional layer for an electrochemical device formed using any one of the compositions for an electrochemical device functional layer set forth above. A functional layer that is formed from any one of the compositions for an electrochemical device functional layer set forth above can cause an electrochemical device that includes the functional layer to display excellent low-temperature output characteristics and high-voltage cycle characteristics.

The present disclosure also aims to advantageously solve the problem set forth above by disclosing an electrochemical device comprising the functional layer for an electrochemical device set forth above. An electrochemical device that includes the functional layer set forth above has excellent electrochemical characteristics such as low-temperature output characteristics and high-voltage cycle characteristics.

Advantageous Effect

According to the present disclosure, it is possible to provide a composition for an electrochemical device functional layer with which it is possible to form a functional layer that can improve low-temperature output characteristics and high-voltage cycle characteristics of an electrochemical device.

Moreover, according to the present disclosure, it is possible to provide a functional layer for an electrochemical device that can improve low-temperature output characteristics and high-voltage cycle characteristics of an electrochemical device.

Furthermore, according to the present disclosure, it is possible to provide an electrochemical device having excellent electrochemical characteristics such as low-temperature output characteristics and high-voltage cycle characteristics.

DETAILED DESCRIPTION

The following provides a detailed description of embodiments of the present disclosure.

The presently disclosed composition for an electrochemical device functional layer is a composition that is used in production of an electrochemical device. Moreover, the presently disclosed composition for an electrochemical device functional layer can be used to form various functional layers such as an electrode mixed material layer, which is a functional layer having a function of giving and receiving electrons inside an electrochemical device, a porous membrane layer, which is a functional layer having a function of reinforcing a component, or an adhesive layer having a function of adhering components to one another. Note that a porous membrane layer may also display adhesive capability. Also, the presently disclosed functional layer for an electrochemical device is formed from the presently disclosed composition for an electrochemical device functional layer. Furthermore, the presently disclosed electrochemical device includes the presently disclosed functional layer for an electrochemical device.

Note that in the present specification, a functional layer that contains electrode active material particles is referred to as an "electrode mixed material layer", a functional layer that contains non-conductive particles but does not contain electrode active material particles is referred to as a "porous membrane layer", a functional layer that contributes to adhesiveness between battery components and contains a binder, but contains neither electrode active material particles nor non-conductive particles, is referred to as an "adhesive layer", and a functional layer that does not correspond to any of the preceding examples is referred to as "another functional layer".

(Composition for Electrochemical Device Functional Layer)

The presently disclosed composition for an electrochemical device functional layer (hereinafter, also referred to simply as a "composition for a functional layer") is a composition containing a solvent and a polymer A that includes an alkylene oxide structure-containing monomer unit and a (meth)acrylic acid ester monomer unit. Note that in addition to the polymer A and the solvent, the presently disclosed composition for a functional layer may contain functional particles that are particles compounded in order to cause a functional layer to display a desired function. For example, the composition for a functional layer can contain non-conductive particles as functional particles. More specifically, the composition for a functional layer may contain either or both of organic particles and inorganic particles as non-conductive particles. In such a case, the composition for a functional layer may be a composition for a porous membrane. Furthermore, the presently disclosed composition for a functional layer may contain other polymers differing from the polymer A that includes an alkylene oxide structure-containing monomer unit and a (meth)acrylic acid ester monomer unit and the functional particles, and may contain other components.

The presently disclosed composition for a functional layer can enhance low-temperature output characteristics and high-voltage cycle characteristics of an electrochemical device including a functional layer obtained therewith as a result of the presently disclosed composition for a functional layer containing the polymer A including an alkylene oxide structure-containing monomer unit and a (meth)acrylic acid ester monomer unit. Although the reason for this is not clear, it may be due to the alkylene oxide structure-containing monomer unit included in the polymer A increasing electrolyte solution affinity of an obtained functional layer to an appropriate level, and thereby inhibiting an increase of internal resistance of an electrochemical device, and also due to the (meth)acrylic acid ester monomer unit included in the polymer A providing the obtained functional layer with an appropriate level of flexibility and inhibiting degradation caused by shrinkage accompanying charging and discharging of the electrochemical device.

<Polymer A>

The polymer A is a component that can increase electrolyte solution affinity of a functional layer formed from the composition for a functional layer. More specifically, the polymer A is a component that can function as what is referred to as a "wetting agent" in the composition for a functional layer. Note that the polymer A is a compound that is a liquid at normal temperature (JIS Z 8703:1983).

[Chemical Composition of Polymer A]

The polymer A is required to include an alkylene oxide structure-containing monomer unit and a (meth)acrylic acid ester monomer unit, and may optionally include structural units derived from other monomers.

—Alkylene Oxide Structure-Containing Monomer Unit—

The alkylene oxide structure-containing monomer unit included in the polymer A is a monomer unit including a structure that can be represented by general formula (I).

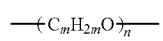

(I)

(In formula (I), m is an integer of 1 or more, and n is an integer of 1 or more.)

Through inclusion of the alkylene oxide structure-containing monomer unit in the polymer A, ion conductivity of a functional layer can be increased, and internal resistance of an obtained electrochemical device can be reduced. In formula (I), the integer m is preferably not less than 2 and not more than 5, more preferably 2 or 3, and even more preferably 2. In a case in which the integer m is 2, a monomer unit including the structural unit represented by general formula (I) is referred to as an ethylene oxide structure-containing monomer unit. Moreover, in a case in which the integer m is 3, a monomer unit including the structural unit represented by general formula (I) is referred to as a propylene oxide structure-containing monomer unit. When the integer m is not more than any of the upper limits set forth above, it is possible to form a functional layer that can cause an electrochemical device to display even better low-temperature output characteristics. Particularly in a case in which the integer m is 2 (i.e., a case in which the polymer A includes an ethylene oxide structure-containing monomer unit), a functional layer can be provided with an appropriate level of hydrophilicity, and affinity of the functional layer with respect to electrolyte solution can be increased. As a result, particularly in a case in which the polymer A includes an ethylene oxide structure-containing monomer unit, it is possible to form a functional layer that can cause an electrochemical device to display especially good low-temperature output characteristics.

It should be noted that the polymer A may include more than one type of alkylene oxide structure-containing monomer unit. In other words, the polymer A may, for example, include both an ethylene oxide structure-containing monomer unit and a propylene oxide structure-containing monomer unit.

The integer n defining the number of repetitions of the alkylene oxide structural unit: —$C_mH_{2m}O$— (m is an integer of 1 or more) included in formula (I) is preferably 30 or less, more preferably 20 or less, and even more preferably 15 or less, and is preferably 2 or more, more preferably 3 or more, and even more preferably 4 or more. In other words, the alkylene oxide structure-containing monomer unit included in the polymer A preferably includes a polyalkylene oxide structural unit in which an alkylene oxide structural unit is repeated n times (n is an integer of not less than 2 and not more than 30). When the number of repetitions n is not less than any of the lower limits set forth above, it is possible to further enhance low-temperature output characteristics of an electrochemical device including a functional layer that is formed using the composition for a functional layer containing the polymer A. Moreover, when the number of repetitions n is not more than any of the upper limits set forth above, it is possible to further enhance high-voltage cycle characteristics of an electrochemical device including a functional layer that is formed using the composition for a functional layer containing the polymer A. Moreover, some or all of the hydrogen atoms of the alkylene oxide structural unit: —$C_mH_{2m}O$— (m is an integer of 1 or more) may be replaced by a substituent. Examples of possible substituents include a phenyl group and the like. In a case in which the alkylene oxide structural unit has two or more substituents, these substituents may be the same or different.

Furthermore, in a case in which the polymer A includes more than one alkylene oxide structure-containing monomer unit, the number of repetitions n may be the same or different for each of the alkylene oxide structure-containing monomer units. In such a case, it is preferable that an average value of every number of repetitions n is within any of the preferred ranges set forth above, and more preferable that every number of repetitions n is within any of the preferred ranges set forth above.

An alkylene oxide structure-containing monomer unit such as described above can be formed using a compound including an alkylene oxide structural unit represented by the preceding formula. This compound may, for example, be a compound that includes a structure represented by the following general formula (II), which includes the structure represented by general formula (I).

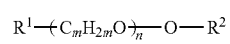

(II)

(In general formula (II), one of $R^1$ and $R^2$ is a (meth)acryloyl group and the other of $R^1$ and $R^2$ indicates a hydrogen atom, a hydroxy group, or a linear or branched alkyl group having a carbon number of 1 to 10.) The linear or branched alkyl group having a carbon number of 1 to 10 may, for example, be a methyl group, an ethyl group, or a propyl group.

Specific examples of compounds that can be represented by general formula (II) include, but are not specifically limited to, methoxy polyethylene glycol (meth)acrylate, ethoxy diethylene glycol (meth)acrylate, polypropylene glycol mono(meth)acrylate, and methoxy polypropylene glycol (meth)acrylate. Of these examples, the compound including an alkylene oxide structural unit is preferably methoxy polyethylene glycol acrylate. Examples of methoxy polyethylene glycol acrylate include methoxy polyethylene glycol #400 acrylate (number of repetitions n: 9) and methoxy polyethylene glycol #550 acrylate (number of repetitions n: 13). Moreover, examples of methoxy polyethylene glycol methacrylate include methoxy polyethylene glycol #1000 methacrylate (number of repetitions n: 23). Note that the number following the hash sign (#) in each of these compound names indicates the weight-average molecular weight of a repeating section of alkylene oxide structural units included in one molecule of the compound. Of these examples, the compound including an alkylene oxide structural unit is preferably methoxy polyethylene glycol #550 acrylate. Note that in the present specification, "(meth)acrylate" is used to indicate "acrylate" or "methacrylate", and "(meth)acryloyl" is used to indicate "acryloyl" or "methacryloyl".

—Proportion of Alkylene Oxide Structure-Containing Monomer Unit—

The proportion in which the alkylene oxide structure-containing monomer unit is included in the polymer A is preferably 5 mol % or more, more preferably 20 mol % or more, and even more preferably 25 mol % or more, and is preferably 95 mol % or less, more preferably 90 mol % or less, and even more preferably 85 mol % or less. When the proportion in which the alkylene oxide structure-containing monomer unit is included in the polymer A is not less than any of the lower limits set forth above, it is possible to further enhance low-temperature output characteristics of an electrochemical device including a functional layer that is formed using the composition for a functional layer containing the polymer A. Moreover, when the proportion in which the alkylene oxide structure-containing monomer unit is included in the polymer A is not more than any of the upper limits set forth above, it is possible to further enhance high-voltage cycle characteristics of an electrochemical device including a functional layer that is formed using the composition for a functional layer containing the polymer A. Note that the proportion in which an alkylene oxide structure-containing monomer unit is included in a polymer A can be measured by a method described in the EXAMPLES section of the present specification.

—(Meth)Acrylic Acid Ester Monomer Unit—

It is preferable that the (meth)acrylic acid ester monomer unit included in the polymer A includes a (meth)acrylic acid alkyl ester monomer unit and that an alkyl group bonded to a non-carbonyl oxygen atom in the (meth)acrylic acid alkyl ester monomer unit is a linear or branched alkyl group having a carbon number of not less than 5 and not more than 20. The carbon number of the alkyl group bonded to the non-carbonyl oxygen atom in the (meth)acrylic acid alkyl ester monomer unit is more preferably 6 or more, and even more preferably 8 or more, and is more preferably 18 or less, and even more preferably 12 or less. When the carbon number of the alkyl group is not less than any of the lower limits set forth above, it is possible to inhibit an excessive increase of electrolyte solution affinity of the polymer A and further enhance high-voltage cycle characteristics of an electrochemical device including a functional layer that is formed using the composition for a functional layer. Moreover, when the carbon number of the alkyl group is not more than any of the upper limits set forth above, it is possible to further enhance low-temperature output characteristics of an electrochemical device including a functional layer that is formed using the composition for a functional layer containing the polymer A.

Examples of monomers that can form the (meth)acrylic acid ester monomer unit include (meth)acrylic acid alkyl esters such as methyl (meth)acrylate, ethyl (meth)acrylate, n-propyl (meth)acrylate, isopropyl (meth)acrylate, n-butyl (meth)acrylate, t-butyl (meth)acrylate, isobutyl (meth)acrylate, n-pentyl (meth)acrylate, isopentyl (meth)acrylate, hexyl (meth)acrylate, heptyl (meth)acrylate, octyl (meth)acrylate, 2-ethylhexyl (meth)acrylate, nonyl (meth)acrylate, decyl (meth)acrylate, lauryl (meth)acrylate, n-tetradecyl (meth)acrylate, and stearyl (meth)acrylate. Of these monomers, 2-ethylhexyl (meth)acrylate (carbon number of alkyl group bonded to non-carbonyl oxygen atom: 8) and stearyl acrylate (carbon number of alkyl group bonded to non-carbonyl oxygen atom: 18) are preferable, and 2-ethylhexyl acrylate is particularly preferable.

—Proportion of (Meth)Acrylic Acid Ester Monomer Unit—

The proportion in which the (meth)acrylic acid ester monomer unit is included in the polymer A is preferably 5 mol % or more, more preferably 10 mol % or more, and even more preferably 15 mol % or more, and is preferably 95 mol % or less, more preferably 90 mol % or less, and even more preferably 75 mol % or less. When the proportion in which the (meth)acrylic acid ester monomer unit is included in the polymer A is not less than any of the lower limits set forth above, it is possible to further enhance high-voltage cycle characteristics of an electrochemical device including a functional layer that is formed using the composition for a functional layer containing the polymer A. Moreover, when the proportion in which the (meth)acrylic acid ester monomer unit is included in the polymer A is not more than any of the upper limits set forth above, it is possible to further enhance low-temperature output characteristics of an electrochemical device including a functional layer that is formed using the composition for a functional layer containing the polymer A. Note that the proportion in which a (meth)acrylic acid ester monomer unit is included in a polymer A can also be measured by a method described in the EXAMPLES section of the present specification.

—Other Monomer Units—

Examples of monomers other than alkylene oxide structure-containing monomers and (meth)acrylic acid ester monomers that can be used in production of the polymer A include monomers including a hydrophobic group such as an alkyl group, an alkenyl group, an alkynyl group, a cycloalkyl group, or an aryl group, and cross-linkable monomers. More specific examples of such other monomers include divinyl monomers such as 1,3-butadiene and isoprene; and aromatic vinyl monomers such as styrene. Examples of cross-linkable monomers include polyfunctional monomers including two or more groups that display polymerization reactivity in the monomer. Of these examples, the use of styrene as another monomer is preferable. Particularly in a case in which the composition for a functional layer contains organic particles as non-conductive particles, adsorptivity of non-conductive particles with respect to these organic particles can be increased through use of another monomer that is hydrophobic in combination with an alkylene oxide structure-containing monomer. This can increase affinity of a functional layer with respect to electrolyte solution.

The proportion in which other monomer units are included in the polymer A is preferably 15 mol % or less, more preferably 5 mol % or less, and even more preferably 1 mol % or less. Particularly in a case in which the polymer A includes a cross-linkable monomer unit as another monomer unit, the proportion in which the cross-linkable monomer unit is included in the polymer A is preferably less than 0.5 mol %. When the proportion in which other monomer units are included in the polymer A is not more than any of the upper limits set forth above, it is possible to further improve electrochemical characteristics of an electrochemical device including a functional layer. Note that the proportion in which other monomer units are included in a polymer A can also be determined by $^1$H-NMR spectroscopy.

[Production Method of Polymer A]

No specific limitations are placed on the method by which the polymer A is produced and production thereof may be carried out by any known polymerization method. The polymerization method of the polymer A is not specifically limited and may, for example, be any of solution polymerization, suspension polymerization, bulk polymerization, and emulsion polymerization. Moreover, the polymerization reaction may be addition polymerization such as ionic polymerization, radical polymerization, or living radical polymerization. Furthermore, a known organic solvent (for example, toluene), water, or the like can be used as a polymerization solvent without any specific limitations. Examples of polymerization initiators that can be used include, but are not specifically limited to, sodium persulfate, ammonium persulfate, and potassium persulfate. Of these polymerization initiators, ammonium persulfate is preferable. One of these polymerization initiators may be used individually, or two or more of these polymerization initiators may be used in combination in a freely selected ratio.

Various conditions such as the additive amount of polymerization initiator and the polymerization temperature can be set within typical ranges.

[Properties of Polymer A]

—Glass-Transition Temperature of Polymer A—

The glass-transition temperature of the polymer A is preferably −70° C. or higher, more preferably −68° C. or higher, and even more preferably −65° C. or higher, and is preferably 95° C. or lower, more preferably 55° C. or lower, and even more preferably 50° C. or lower. When the glass-transition temperature of the polymer A is not lower than any of the lower limits set forth above, low-temperature output characteristics and high-voltage cycle characteristics of an electrochemical device including a functional layer can be further improved. Moreover, when the glass-transition temperature of the polymer A is not higher than any of the upper limits set forth above, low-temperature output characteristics of an electrochemical device including a functional layer can be further improved. Note that the "glass-transition temperature" of a polymer A can be measured by differential scanning calorimetry in accordance with JIS K7121:2012.

The glass-transition temperature of the polymer A can be controlled by adjusting the chemical composition of the polymer A, for example. More specifically, the glass-transition temperature can be lowered by increasing the proportion of the alkylene oxide structure-containing monomer unit in the polymer A and can be raised by reducing the proportion of the alkylene oxide structure-containing monomer unit in the polymer A. Moreover, the glass-transition temperature can be raised by increasing the proportion in which a (meth)acrylic acid ester monomer is included in production of the polymer A and, conversely, can be lowered by reducing the proportion in which the (meth)acrylic acid ester monomer is included.

—Solubility Parameter of Polymer A—

The solubility parameter (SP value) of the polymer A is preferably 15 $(J/cm^3)^{1/2}$ or more, more preferably 16 $(J/cm^3)^{1/2}$ or more, and even more preferably 16.5 $(J/cm^3)^{1/2}$ or more, and is preferably 20 $(J/cm^3)^{1/2}$ or less. When the SP value of the polymer A is not less than any of the lower limits set forth above, low-temperature output characteristics of an electrochemical device including a functional layer can be further improved. Moreover, when the SP value of the polymer A is not more than the upper limit set forth above, high-voltage cycle characteristics of an electrochemical device including a functional layer can be further improved. The SP value of the polymer A can be estimated from the molecular structure of the polymer A. Specifically, the SP value can be calculated by simulation software (for example, HSPiP (https://www.hansen-solubility.com/)) that can calculate the SP value from a SMILE formula. This simulation software determines the SP value based on the theory described in "Hansen Solubility Parameters: A User's Handbook, Second Edition, Charles M. Hansen".

[Amount of Polymer A]

In a case in which the presently disclosed composition for a functional layer contains non-conductive particles, the amount of the polymer A in the composition for a functional layer when the total amount of the non-conductive particles and the polymer A is taken to be 100 mass % is preferably 1 mass % or more, more preferably 3 mass % or more, and even more preferably 5 mass % or more, and is preferably 90 mass % or less, more preferably 80 mass % or less, and even more preferably 50 mass % or less. When the amount of the polymer A in the composition for a functional layer is not less than any of the lower limits set forth above in a case in which the composition for a functional layer contains non-conductive particles, low-temperature output characteristics of an electrochemical device including a functional layer can be further improved. Moreover, when the amount of the polymer A in the composition for a functional layer is not more than any of the upper limits set forth above, high-voltage cycle characteristics of an electrochemical device including a functional layer can be further improved.

In a case in which the composition for a functional layer does not contain non-conductive particles but does contain an electrode active material (i.e., a case in which a functional layer that can be formed using the composition for a functional layer is an electrode mixed material layer), the amount of the polymer A is preferably not less than 1 part by mass and not more than 10 parts by mass per 100 parts by mass of the electrode active material. When the amount of the polymer A in the composition for a functional layer is within the range set forth above in a case in which the composition for a functional layer contains an electrode active material, electrochemical characteristics such as low-temperature output characteristics and high-voltage cycle characteristics of an electrochemical device including a functional layer can be further improved.

In a case in which the composition for a functional layer does not contain non-conductive particles and an electrode active material, but does contain a polymer that can function as a subsequently described binder (i.e., contains a binder), the amount of the polymer A is preferably not less than 90 mass % and less than 100 mass % when the total amount of the binder and the polymer A is taken to be 100 mass %. When the amount of the polymer A in the composition for a functional layer is within the range set forth above in a case in which the composition for a functional layer contains neither non-conductive particles nor an electrode active material, electrochemical characteristics such as low-temperature output characteristics and high-voltage cycle characteristics of an electrochemical device including a functional layer can be further improved.

<Functional Particles>

The functional particles that are particles compounded in order to cause a functional layer to display a desired function may, for example, be non-conductive particles in a case in which the functional layer is a porous membrane layer or electrode active material particles in a case in which the functional layer is an electrode mixed material layer.

[Non-Conductive Particles]

Any known non-conductive particles that are used in electrochemical devices such as secondary batteries can be used as non-conductive particles serving as functional particles without any specific limitations. Through inclusion of non-conductive particles as functional particles in the presently disclosed composition for a functional layer, a functional layer that is formed using the composition for a functional layer can be provided with adhesiveness and/or mechanical strength, and the functional layer can be caused to function as a porous membrane.

Specifically, either or both of inorganic particles and organic particles can be used as non-conductive particles.

Examples of inorganic particles that can be used include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary. Compounding of inorganic particles as non-conductive particles can effectively increase mechanical strength of a functional layer.

Examples of organic particles that can be used include, but are not specifically limited to, an aliphatic conjugated diene/aromatic vinyl copolymer (polymer including mainly an aliphatic conjugated diene monomer unit and an aromatic vinyl monomer unit) such as a styrene-butadiene copolymer (SBR); an aliphatic conjugated diene/acrylonitrile copolymer such as a butadiene-acrylonitrile copolymer (NBR); a fluoropolymer (polymer including mainly a fluorine-containing monomer unit) such as a polyvinylidene fluoride-hexafluoropropylene copolymer; and an acrylic polymer (polymer including mainly a (meth)acrylic acid ester monomer unit and a (meth)acrylonitrile unit). Examples of various monomers that can form the various monomer units include known examples of such monomers. Note that in the present specification, "(meth)acrylonitrile" is used to indicate "acrylonitrile" or "methacrylonitrile". Compounding of organic particles as non-conductive particles can increase adhesiveness of a functional layer. Also note that the phrase "including mainly" used with respect to one type of monomer unit or two or more types of monomer units in the present disclosure means that "when the amount of all monomer units included in a polymer is taken to be 100 mass %, the proportion in which the one type of monomer unit is included or the total proportion in which the two or more types of monomer units are included is more than 50 mass %". Compounding of organic particles as non-conductive particles can provide a functional layer with adhesiveness and/or mechanical strength. Note that the organic particles are particles differing from the polymer A of the presently disclosed composition for a functional layer in terms of chemical composition and properties, and polymers corresponding to the polymer A are not included among these organic particles.

In particular, it is preferable that a particulate polymer having a core-shell structure (hereinafter, also referred to as "core-shell particles") is contained as organic particles. The term "core-shell structure" refers to a structure including a core portion and a shell portion formed by polymers that differ from one another in terms of chemical composition and/or properties. The shell portion at least partially covers the outer surface of the core portion. In terms of external appearance, even in a situation in which the outer surface of the core portion appears to be completely covered by the shell portion, pores may be formed that pass between inside and outside of the shell portion. The particulate polymer having such a core-shell structure may, for example, be an acrylic polymer including a core portion and a shell portion such as described below, but is not specifically limited thereto. The core portion of the core-shell particles may be a polymer formed through polymerization of a (meth)acrylonitrile monomer such as (meth)acrylonitrile; a (meth)acrylic acid ester monomer such as methyl (meth)acrylate, ethyl (meth)acrylate, butyl (meth)acrylate, or 2-ethylhexyl (meth)acrylate; an acid group-containing monomer such as (meth)acrylic acid; an aromatic vinyl monomer such as styrene or a styrene derivative (for example, styrene sulfonic acid); and a cross-linkable monomer such as a di(meth)acrylic acid ester compound (for example, ethylene dimethacrylate, diethylene glycol dimethacrylate, ethylene glycol dimethacrylate, diethylene glycol diacrylate, or 1,3-butylene glycol diacrylate), and the shell portion of the core-shell particles may be a polymer formed through polymerization of the same types of monomers as aromatic vinyl monomers, acid group-containing monomers, and/or the like that can be used in formation of the core portion. Note that a (meth)acrylonitrile monomer, (meth)acrylic acid ester monomer, aromatic vinyl monomer, or the like used in formation of the organic particles may be the same as or different from a monomer used for the polymer A such as previously described. It is preferable that the total proportion in which a (meth)acrylic acid ester monomer unit and a (meth)acrylonitrile unit are included is more than 50 mass % in at least a polymer forming the core portion of the core-shell particles. Compounding of core-shell particles as non-conductive particles can provide a functional layer with even better process adhesiveness.

Note that it is possible to confirm whether or not organic particles have a core-shell structure by observing the cross-sectional structure of the organic particles under magnification using a scanning electron microscope (SEM) or the like.

—Properties of Non-Conductive Particles—

The volume-average particle diameter of inorganic particles and organic particles used as non-conductive particles is preferably not less than 300 nm and not more than 2,000 nm. The "volume-average particle diameter" of non-conductive particles expresses the particle diameter at which cumulative volume calculated from the small diameter end of a particle size distribution (volume basis) measured by laser diffraction reaches 50%.

In a case in which the non-conductive particles are organic particles, these organic particles are water-insoluble. Therefore, the organic particles are normally in a particulate form in a composition for a functional layer in which water is used as a solvent and maintain the shape of particles when contained in a functional layer. When organic particles are referred to as "water-insoluble", this means that when 0.5 g of the organic particles are dissolved in 100 g of water at 25° C., insoluble content is 90 mass % or more.

Moreover, in a case in which the non-conductive particles are organic particles, the degree of swelling of the organic particles with respect to electrolyte solution (hereinafter, also referred to as the "degree of swelling in electrolyte solution") is preferably 100% or more, more preferably 120% or more, and even more preferably 150% or more, and is preferably 1,500% or less, more preferably 1,000% or less, and even more preferably 500% or less. When the degree of swelling in electrolyte solution of the organic particles is within any of the ranges set forth above, electrochemical characteristics of an electrochemical device including an obtained functional layer can be further improved. Note that the degree of swelling in electrolyte solution of organic particles can be measured by a method described in the EXAMPLES section.

—Amount of Non-Conductive Particles—

The amount of the non-conductive particles in the presently disclosed composition for a functional layer when the total amount of the non-conductive particles and the polymer A is taken to be 100 mass % is preferably 10 mass % or more, more preferably 20 mass % or more, and even more preferably 50 mass % or more, and is preferably 99 mass % or less, more preferably 97 mass % or less, and even more preferably 95 mass % or less. When the amount of the non-conductive particles in the composition for a functional layer is not less than any of the lower limits set forth above, high-voltage cycle characteristics of an electrochemical device including a functional layer can be further improved. Moreover, when the amount of the non-conductive particles in the composition for a functional layer is not more than any of the upper limits set forth above, low-temperature output characteristics of an electrochemical device including a functional layer can be further improved.

—Proportion of Organic Particles Among Non-Conductive Particles—

In a case in which the presently disclosed composition for a functional layer contains non-conductive particles, these non-conductive particles may all be organic particles, may all be inorganic particles, or may be a mixture of organic particles and inorganic particles. In a case in which the non-conductive particles are a mixture of organic particles and inorganic particles, the organic particles may, for example, constitute not less than 5 volume % and not more than 50 volume % when all of the non-conductive particles are taken to be 100 volume %.

[Electrode Active Material Particles]

Particles formed from known electrode active materials that are used in electrochemical devices such as secondary batteries can be used without any specific limitations as electrode active material particles serving as functional particles. Specifically, examples of electrode active material particles that can be used in an electrode mixed material layer of a lithium ion secondary battery, which is one example of a secondary battery, include particles formed from any of the electrode active materials described below, but are not specifically limited thereto. Compounding of electrode active material particles as functional particles in the presently disclosed composition for a functional layer enables a functional layer that can be formed using the composition for a functional layer to function as an electrode mixed material layer.

—Positive Electrode Active Material—

A positive electrode active material compounded in a positive electrode mixed material layer of a positive electrode in a lithium ion secondary battery may, for example, be a compound including a transition metal such as a transition metal oxide, a transition metal sulfide, or a complex metal oxide of lithium and a transition metal. Examples of the transition metal include Ti, V, Cr, Mn, Fe, Co, Ni, Cu, and Mo.

Specific examples of positive electrode active materials include, but are not specifically limited to, lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a lithium-rich spinel compound represented by $Li_{1+x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$.

One of these positive electrode active materials may be used individually, or two or more of these positive electrode active materials may be used in combination.

—Negative Electrode Active Material—

A negative electrode active material compounded in a negative electrode mixed material layer of a negative electrode in a lithium ion secondary battery may, for example, be a carbon-based negative electrode active material, a metal-based negative electrode active material, or a negative electrode active material that is a combination thereof.

The term "carbon-based negative electrode active material" refers to an active material having a main framework of carbon into which lithium can be inserted (also referred to as "doping"). Specific examples of carbon-based negative electrode active materials include carbonaceous materials such as coke, mesocarbon microbeads (MCMB), mesophase pitch-based carbon fiber, pyrolytic vapor-grown carbon fiber, pyrolyzed phenolic resin, polyacrylonitrile-based carbon fiber, quasi-isotropic carbon, pyrolyzed furfuryl alcohol resin (PFA), and hard carbon, and graphitic materials such as natural graphite and artificial graphite.

The term "metal-based negative electrode active material" refers to an active material that contains metal, the structure of which usually contains an element that allows insertion of lithium, and that has a theoretical electric capacity per unit mass of 500 mAh/g or more when lithium is inserted. Examples of metal-based active materials include lithium metal, simple substances of metals that can form a lithium alloy (for example, Ag, Al, Ba, Bi, Cu, Ga, Ge, In, Ni, P, Pb, Sb, Si, Sn, Sr, Zn, and Ti), and oxides, sulfides, nitrides, silicides, carbides, and phosphides thereof. Moreover, an oxide such as lithium titanate can be used.

One of these negative electrode active materials may be used individually, or two or more of these negative electrode active materials may be used in combination.

<Other Polymers>

Besides the components described above, the composition for a functional layer may contain other polymers that differ from the polymer A and the organic particles serving as non-conductive particles. Examples of "other polymers" include a polymer that can function as a binder in the composition for a functional layer (hereinafter, also referred to simply as a "binder"). In a functional layer formed on a substrate using the composition for a functional layer, the binder can hold components such as functional particles so that these components do not become detached from the functional layer and enables adhesion of battery components to one another via the functional layer.

[Type of Binder]

No specific limitations are placed on the binder other than being a binder that can be used in an electrochemical device. For example, the binder may be a polymer that is obtained through polymerization of a monomer composition containing a monomer that can display binding capacity (i.e., a synthetic polymer such as an addition polymer obtained through addition polymerization). The aforementioned polymer may, for example, be a fluoropolymer (polymer including mainly a fluorine-containing monomer unit) such as polyvinylidene fluoride; an aliphatic conjugated diene/aromatic vinyl copolymer (polymer including mainly an aliphatic conjugated diene monomer unit and an aromatic vinyl monomer unit) such as a styrene-butadiene copolymer (SBR); an aliphatic conjugated diene/acrylonitrile copolymer such as a butadiene-acrylonitrile copolymer (NBR); or a vinyl alcohol polymer such as polyvinyl alcohol. One of these polymers may be used individually, or two or more of these polymers may be used in combination in a freely selected ratio. Of these polymers, aliphatic conjugated diene/aromatic vinyl copolymers and fluoropolymers are preferable. Examples of various monomers that can form the various monomer units include known examples of such monomers.

[Properties of Binder]

In a case in which the binder is water-insoluble and is present in a particulate form in a composition for a functional layer containing water as a solvent, the volume-average particle diameter of the binder is preferably less than 300 nm. When the volume-average particle diameter of the binder is less than 300 nm, electrochemical device internal resistance can be reduced, and electrochemical characteristics of an electrochemical device including an obtained functional layer can be improved. When a binder is referred to as "water-insoluble", this means that when 0.5 g of the binder is dissolved in 100 g of water at 25° C., insoluble content is 90 mass % or more. The volume-average particle diameter of a binder can be determined by the same measurement method as for the volume-average particle diameter of non-conductive particles described above.

<Other Components>

The presently disclosed composition for a functional layer may optionally contain known additives that can be added to a functional layer (electrode mixed material layer, porous membrane layer, adhesive layer, etc.) such as a conductive material, a wetting agent, a viscosity modifier, and an additive for electrolyte solution. One of these other components may be used individually, or two or more of these other components may be used in combination.

<Solvent>

Either water or an organic solvent can be used as the solvent contained in the composition for a functional layer without any specific limitations. Examples of organic solvents that can be used include acetonitrile, N-methyl-2-pyrrolidone, tetrahydrofuran, acetone, acetylpyridine, cyclopentanone, dimethylformamide, dimethyl sulfoxide, methylformamide, methyl ethyl ketone, furfural, ethylenediamine, dimethylbenzene (xylene), methylbenzene (toluene), cyclopentyl methyl ether, and isopropyl alcohol.

One of these solvents may be used individually, or two or more of these solvents may be used as a mixture in a freely selected mixing ratio.

<Production Method of Composition for Functional Layer>

Although no specific limitations are placed on the method by which the composition for a functional layer is produced, the composition for a functional layer is normally produced by mixing the polymer and optional components (functional particles, binder, and other components) in a solvent. Also note that no specific limitations are placed on the mixing method, and mixing may be performed using a typically used stirrer or disperser.

(Functional Layer for Electrochemical Device)

The presently disclosed functional layer is a layer having a function such as reinforcement of a component, adhesion between components, or giving and receiving electrons inside an electrochemical device. For example, the functional layer may be an electrode mixed material layer in which electrons are given and received through electrochemical reactions, a porous membrane layer that improves heat resistance and strength, or an adhesive layer that improves adhesiveness. Moreover, the presently disclosed functional layer is a layer that is formed from the presently disclosed composition for a functional layer set forth above. For example, the presently disclosed functional layer can be formed by applying the composition for a functional layer set forth above onto the surface of a suitable substrate to form a coating film, and then drying the coating film that is formed. In other words, the presently disclosed functional layer is formed by a dried product of the composition for a functional layer set forth above and normally contains at least the polymer A. Note that since components contained in the functional layer are components that were contained in the composition for a functional layer set forth above, the preferred ratio of these components is the same as the preferred ratio of the components in the composition for a functional layer. In a case in which the polymer A, organic particles, or binder that can be contained in the composition for a functional layer is a polymer including a cross-linkable functional group (for example, an epoxy group), the polymer may be cross-linked during drying of the composition for a functional layer or during heat treatment or the like that is optionally performed after drying (i.e., the functional layer may contain a cross-linked product of the previously described polymer A, organic particles, or binder).

The presently disclosed functional layer can cause an electrochemical device that includes a battery component including the presently disclosed functional layer to display excellent electrochemical characteristics (low-temperature output characteristics, high-voltage cycle characteristics, etc.) as a result of the presently disclosed functional layer being formed from the presently disclosed composition for a functional layer.

[Substrate]

No limitations are placed on the substrate onto which the composition for a functional layer is applied. For example, a coating film of the composition for a functional layer may be formed on the surface of a releasable substrate, the coating film may be dried to form a functional layer, and then the releasable substrate may be peeled from the functional layer. The functional layer that is peeled from the releasable substrate in this manner can be used as a free-standing film in formation of a component of an electrochemical device.

However, it is preferable that a current collector, a separator substrate, or an electrode substrate is used as the substrate from a viewpoint of raising component production efficiency since a step of peeling the functional layer can be omitted. More specifically, the composition for a functional layer is preferably applied onto a current collector serving as a substrate in a case in which an electrode mixed material layer is to be produced. Moreover, the composition for a functional layer is preferably applied onto a separator substrate or an electrode substrate in a case in which a porous membrane layer or an adhesive layer is to be produced.

—Current Collector—

The current collector is a material having electrical conductivity and electrochemical durability. Specifically, the current collector may be made of, for example, iron, copper, aluminum, nickel, stainless steel, titanium, tantalum, gold, or platinum. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

—Separator Substrate—

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof.

—Electrode Substrate—

The electrode substrate is not specifically limited and may be an electrode substrate obtained by forming an electrode mixed material layer containing electrode active material particles and a binder on a current collector such as previously described.

The electrode active material particles and the binder contained in the electrode mixed material layer of the electrode substrate are not specifically limited and may be electrode active material particles such as previously described and a binder such as previously described.

[Formation Method of Functional Layer]

Examples of methods by which the functional layer may be formed on a substrate such as the current collector, separator substrate, or electrode substrate described above include:

(1) a method in which the presently disclosed composition for a functional layer is applied onto the surface of the substrate (surface at an electrode mixed material layer side in the case of an electrode substrate; same applies below) and is then dried;

(2) a method in which the substrate is immersed in the presently disclosed composition for a functional layer and is then dried; and (3) a method in which the presently disclosed composition for a functional layer is applied onto a releasable substrate and is dried to produce a functional layer that is then transferred onto the surface of the substrate.

Of these methods, method (1) is particularly preferable since it allows simple control of the thickness of the functional layer. In more detail, method (1) includes a step of applying the composition for a functional layer onto a substrate (application step) and a step of drying the composition for a functional layer that has been applied onto the substrate to form a functional layer (drying step).

—Application Step—

Examples of methods by which the composition for a functional layer can be applied onto the substrate in the application step include, but are not specifically limited to, doctor blading, reverse roll coating, direct roll coating, gravure coating, extrusion coating, and brush coating.

—Drying Step—

The method by which the composition for a functional layer on the substrate is dried in the drying step is not specifically limited and may be a commonly known method. Examples of drying methods that can be used include drying by warm, hot, or low-humidity air; drying in a vacuum; and drying through irradiation with infrared light, electron beams, or the like. The drying temperature is preferably lower than 200° C., and more preferably lower than 150° C.

(Component Including Functional Layer)

A component (separator or electrode) that includes the presently disclosed functional layer may also include constituent elements other than the presently disclosed functional layer set forth above and a substrate so long as the effects disclosed herein are not significantly lost. Examples of such other constituent elements include, but are not specifically limited to, any electrode mixed material layer, porous membrane layer, or adhesive layer that does not correspond to the presently disclosed functional layer.

Moreover, the component may include more than one type of the presently disclosed functional layer. For example, an electrode may include an electrode mixed material layer formed from the presently disclosed composition for a functional layer on a current collector and may also include a porous membrane, adhesive layer, and/or "other functional layer" formed from the presently disclosed composition for a functional layer on the electrode mixed material layer. Moreover, a separator may, for example, include a porous membrane layer formed from the presently disclosed composition for a functional layer on a separator substrate and may also include an adhesive layer formed from the presently disclosed composition for a functional layer on the porous membrane layer.

A battery component that includes the presently disclosed functional layer can be well adhered to an adjacent battery component and/or can cause an electrochemical device to display excellent electrochemical characteristics (for example, low-temperature output characteristics and high-voltage cycle characteristics).

(Electrochemical Device)

The presently disclosed electrochemical device includes the presently disclosed functional layer set forth above. More specifically, in a case in which the presently disclosed electrochemical device is a secondary battery, the secondary battery includes a positive electrode, a negative electrode, a separator, and an electrolyte solution, wherein the functional layer for an electrochemical device set forth above is included by at least one battery component among the positive electrode, the negative electrode, and the separator, or may form an adhesive layer between these battery components and a casing. The presently disclosed electrochemical device can display excellent electrochemical characteristics (for example, low-temperature output characteristics and high-voltage cycle characteristics).

<Positive Electrode, Negative Electrode, and Separator>

In a case in which the presently disclosed electrochemical device is a secondary battery, at least one of a positive electrode, a negative electrode, and a separator used in the secondary battery is a battery component that includes the presently disclosed functional layer set forth above. Also note that a known positive electrode, negative electrode, or separator can be used without any specific limitations as a positive electrode, negative electrode, or separator that does not include the presently disclosed functional layer.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Suitable examples in the case of a lithium ion secondary battery include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Electrochemical Device>

The secondary battery set forth above as one type of the presently disclosed electrochemical device can be produced by, for example, stacking the positive electrode and the negative electrode with the separator in-between, performing rolling, folding, or the like of the resultant laminate as necessary to place the laminate in a battery container, injecting the electrolyte solution into the battery container, and sealing the battery container. At least one component among the positive electrode, the negative electrode, and the separator is a battery component that includes the presently disclosed functional layer. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to evaluate the proportion in which an alkylene oxide structure-containing monomer unit and a (meth)acrylic acid ester monomer unit were included in a polymer, the number of repetitions n of an alkylene oxide structural unit in an alkylene oxide structure-containing monomer unit of a polymer, the glass-transition temperature of a polymer, the SP value of a polymer, the volume-average particle diameter of organic particles serving as non-conductive particles and a binder, the degree of swelling in electrolyte solution of organic particles, the process adhesiveness of a functional layer, and the low-temperature output characteristics and high-voltage cycle characteristics of an electrochemical device.

<Proportion of Each Monomer Unit in Polymer>

A polymer produced or prepared in each example or comparative example was dissolved in deuterated chloroform as a measurement solvent to obtain a measurement sample. Tetramethylsilane was used as a chemical shift standard. A $^1$H-NMR spectrum was measured for the measurement sample by nuclear magnetic resonance spectroscopy. The proportions in which an oxide structure-containing monomer unit and a (meth)acrylic acid ester monomer unit were included in the polymer were obtained based on an area ratio of obtained peaks.

<Number of Repetitions n of Alkylene Oxide Structural Unit in Polymer>

A polymer produced or prepared in each example or comparative example was dissolved in deuterated chloroform as a measurement solvent to obtain a measurement sample. Tetramethylsilane was used as a chemical shift standard. A $^{13}$C-NMR spectrum was measured for the measurement sample by nuclear magnetic resonance spectroscopy. The number of repetitions n of an alkylene oxide structural unit in the polymer was determined from an area ratio of the area of peaks attributed to a polyalkylene oxide structure and an average value for the area of peaks attributed to other carbon atoms included in an alkylene oxide structure-containing monomer unit through the measured values in the $^{13}$C-NMR spectrum. Note that peaks confirmed in proximity to a chemical shift of 71 ppm were taken to be peaks attributed to a polyalkylene oxide structure.

<Glass-Transition Temperature of Polymer>

A polymer produced or prepared in each example or comparative example was used as a measurement sample to measure a DSC (Differential Scanning Calorimetry) curve in accordance with JIS K7121:2012 using a differential scanning calorimeter (EXSTAR DSC6220 produced by SII NanoTechnology Inc.). Specifically, 10 mg of dried measurement sample was weighed into an aluminum pan and then a DSC curve was measured with an empty aluminum pan as a reference in a measurement temperature range of −100° C. to 100° C. and at a heating rate of 10° C./min while under normal temperature and humidity conditions. In the heating process, the glass-transition temperature of the polymer was determined from the point of intersection of a baseline directly before a heat absorption peak on the DSC curve at which a derivative signal (DDSC) reached 0.05 mW/min/mg or more and a tangent to the DSC curve at a first inflection point after the heat absorption peak.

<SP Value of Polymer>

The SP value of a polymer produced or prepared in each example or comparative example was calculated using HSPiP. The results are shown in Table 1.

<Volume-Average Particle Diameter of Organic Particles and Binder>

For organic particles and/or binders prepared or produced in Examples 1 to 8 and 10 to 13, and Comparative Examples 1 and 2, a water dispersion having a solid content concentration of 0.1 mass % was produced, and then a laser diffraction particle diameter distribution analyzer (SALD-7100 produced by Shimadzu Corporation) was used to acquire a particle size distribution (volume basis). The particle diameter at which cumulative volume calculated from the small diameter end of the obtained particle size distribution reached 50% was determined as the volume-average particle diameter.

<Degree of Swelling in Electrolyte Solution of Organic Particles>

A water dispersion of organic particles obtained in each of Examples 1 to 4, 6, and 10 to 13, and Comparative Examples 1 and 2 was applied onto copper foil and was dried by a hot-air dryer at 50° C. for 20 minutes and at 120° C. for 20 minutes to prepare a 1 cm×1 cm film (thickness: 100 μm). The weight M0 of the film was measured. The obtained film was subsequently immersed in electrolyte solution at 60° C. for 72 hours. Note that the electrolyte solution was a solution obtained by dissolving $LiPF_6$ as a supporting electrolyte with a concentration of 1 M in a mixed solvent of ethylene carbonate (EC), diethyl carbonate (DEC), and vinylene carbonate (VC) (EC/DEC/VC=68.5/30/1.5 (volume ratio)). After immersion, electrolyte solution on the surface of the film was wiped off, and the weight M1 of the film was measured. The degree of swelling in electrolyte solution of the organic particles was calculated by the following formula.

Degree of swelling in electrolyte solution (%)=$M1/M0$×100

<Process Adhesiveness of Functional Layer>

A positive electrode, a negative electrode, and a separator produced in each of Examples 1 to 6 and 10 to 13, and Comparative Examples 1 and 2 were each cut out to 10 mm in width and 50 mm in length. A test specimen was prepared by stacking a positive electrode with a separator or stacking a negative electrode with a separator, and then pressing the resultant laminate at 30 m/min by roll pressing with a load of 10 kN/m and a temperature of 40° C. The test specimen was placed with the surface at the current collector side of the electrode (positive electrode or negative electrode) facing downward, and cellophane tape was affixed to the surface of the electrode. Tape prescribed by JIS Z1522:2009 was used as the cellophane tape. Moreover, the cellophane tape was secured to a horizontal test stage in advance. One end of the separator substrate was subsequently pulled vertically upward at a pulling speed of 50 mm/min to peel off the separator substrate, and the stress during peeling was measured. This measurement was performed three times for laminates including a positive electrode and a separator and three times for laminates including a negative electrode and a separator (i.e., six times in total). The average value of the stress was determined as the peel strength, and then adhesiveness of an electrode substrate and a separator substrate prior to electrolyte solution immersion was evaluated by the following standard. A larger peel strength indicates higher process adhesiveness of a functional layer formed as a porous membrane layer on the separator.

A: Peel strength of 10 N/m or more
B: Peel strength of not less than 5 N/m and less than 10 N/m
C: Peel strength of less than 5 N/m <Low-Temperature Output Characteristics of Electrochemical Device>

A lithium ion secondary battery (cell) produced as an electrochemical device in each example or comparative example was charged to 4.3 V by a constant current-constant voltage (CC-CV) method in an atmosphere having a temperature of 25° C. for cell preparation. The prepared cell was discharged to 3.0 V by 0.2 C and 1 C constant current methods in an atmosphere having a temperature of −10° C., and the electric capacity was determined. A discharge capacity maintenance rate expressed by the ratio of the electric capacities (=(electric capacity at 1 C/electric capacity at 0.2 C)×100(%)) was calculated. Note that these measurements were performed for five cells. The average value of the discharge capacity maintenance rates for these cells was evaluated by the following standard as a low-temperature output characteristic. A larger value indicates that a cell (electrochemical device) has better low-temperature output characteristics.

A: 90% or more
B: Not less than 80% and less than 90%
C: Not less than 70% and less than 80%
D: Less than 70%

<High-Voltage Cycle Characteristics of Electrochemical Device>

A lithium ion secondary battery (cell) produced as an electrochemical device in each example or comparative example was subjected to 200 charge/discharge cycles of charging to 4.4 V and discharging to 3.0 V by a 0.5 C constant current method in an atmosphere having a temperature of 45° C. A charge/discharge capacity maintenance rate expressed by the ratio of electric capacity at the end of 200 cycles and electric capacity at the end of 5 cycles (=(electric capacity at end of 200 cycles/electric capacity at end of 5 cycles)×100(%)) was calculated. Note that these measurements were performed for five cells. The average value of the charge/discharge capacity maintenance rates for these cells was evaluated by the following standard as the charge/discharge capacity retention rate. A larger value indicates better high-voltage cycle characteristics.

A: Charge/discharge capacity retention rate of 95% or more
B: Charge/discharge capacity retention rate of not less than 90% and less than 95%
C: Charge/discharge capacity retention rate of less than 90%

Example 1

<Production of Polymer A>

A glass reactor that was equipped with a stirrer and had been purged with nitrogen was charged with 6.05 g of methoxy polyethylene glycol #550 acrylate (AM-130G produced by Shin-Nakamura Chemical Co., Ltd.), which is an ethylene oxide structure-containing compound, as an alkylene oxide structure-containing monomer, 3.95 g of 2-ethylhexyl acrylate as a (meth)acrylic acid ester monomer, and 100.0 g of toluene as an organic solvent, and these materials were heated to 80° C. Next, 0.1 g of ammonium persulfate was added as an initiator. The reaction was terminated by cooling to room temperature at the point at which the polymerization conversion rate reached 95%. Toluene was removed from the obtained reaction product using an evaporator to yield a polymer A that was a liquid at room temperature. The proportion in which each monomer unit was included in the polymer A, the number of repetitions n of an alkylene oxide structural unit in the polymer A, the glass-transition temperature of the polymer A, and the SP value of the polymer A were measured as previously described. The results are shown in Table 1.

<Production of Organic Particles as Non-Conductive Particles>

A particulate polymer having a core-shell structure was produced as non-conductive particles. First, in core portion formation, 22.0 parts of acrylonitrile as a (meth)acrylonitrile monomer, 33.0 parts of butyl acrylate as a (meth)acrylic acid ester monomer, 42.0 parts of styrene as an aromatic vinyl monomer, 2.0 parts of methacrylic acid monomer as an acid group-containing monomer, 1.0 parts of ethylene glycol dimethacrylate as a cross-linkable monomer, 1 part of sodium dodecylbenzenesulfonate as an emulsifier, 150 parts of deionized water, and 0.5 parts of potassium persulfate as a polymerization initiator were loaded into a 5 MPa pressure vessel equipped with a stirrer, were sufficiently stirred, and were then heated to 60° C. to initiate polymerization. Once the polymerization conversion rate reached 96%, 98 parts of styrene and 2 parts of methacrylic acid were continuously added for shell portion formation, and the temperature was raised to 70° C. to continue polymerization. The reaction was terminated by cooling at the point at which the conversion rate reached 96% to yield a water dispersion containing, as non-conductive particles, organic particles that were a particulate polymer having a core-shell structure. The volume-average particle diameter of the obtained organic particles was measured as previously described. The result is shown in Table 1. The degree of swelling in electrolyte solution of the organic particles, measured as previously described, was 400%. The organic particles were confirmed to have a core-shell structure by observing the cross-sectional structure thereof under magnification using an SEM.

<Other Polymer (Binder)>

Addition of a mixture of 33 parts of 1,3-butadiene as an aliphatic conjugated diene monomer, 62 parts of styrene as an aromatic vinyl monomer, 4 parts of itaconic acid as a carboxy group-containing monomer, 0.3 parts of tert-dodecyl mercaptan as a chain transfer agent, and 0.3 parts of sodium lauryl sulfate as an emulsifier from a vessel A to a pressure vessel B was initiated and, simultaneously thereto, addition of 1 part of potassium persulfate as a polymerization initiator to the pressure vessel B was initiated to initiate polymerization. Note that a reaction temperature of 75° C. was maintained.

Once 4 hours had passed from the start of polymerization (once 70% of the mixture had been added into the pressure vessel B), 1 part of 2-hydroxyethyl acrylate (acrylic acid-2-hydroxyethyl), which is a hydroxy group-containing monomer, was added into the pressure vessel B over 1 hour and 30 minutes.

Addition of the total amount of the above-described monomers was completed 5 hours and 30 minutes after the start of polymerization. Heating was subsequently performed to 85° C. and a reaction was carried out for 6 hours.

The reaction was terminated by cooling at the point at which the polymerization conversion rate reached 97% to yield a mixture containing a particulate styrene butadiene (SBR) copolymer. The mixture containing the SBR copolymer was adjusted to pH 8 through addition of 5% sodium hydroxide aqueous solution. Thereafter, unreacted monomer was removed by thermal-vacuum distillation. Cooling was then performed to obtain a water dispersion (solid content concentration: 40%) containing the SBR copolymer (binder). The volume-average particle diameter of the obtained SBR copolymer (binder) was measured as previously described. The result is shown in Table 1. Moreover, the obtained SBR copolymer was confirmed to be water-insoluble.

<Production of Composition for Electrochemical Device Functional Layer>

In a stirring vessel, 10 parts of the polymer A obtained as previously described and a water dispersion containing 90 parts in terms of solid content of the organic particles obtained as non-conductive particles as previously described were mixed. Next, a water dispersion containing 25 parts in terms of solid content of the binder was added to this mixture. The resultant mixture was then diluted to a solid content concentration of 10% with deionized water to obtain a composition for a functional layer for a porous membrane.

<Production of Functional Layer-Equipped Separator>

The composition for a functional layer for a porous membrane obtained as described above was applied onto a separator made from polypropylene (Celgard 2500 produced by Celgard, LLC.) as a substrate and was dried at 50° C. for 3 minutes. This operation was performed with respect to both sides of the substrate to obtain a functional layer-equipped separator including, at both sides, a functional layer for an electrochemical device having a thickness of 1 μm at each side. The obtained functional layer-equipped separator was used with negative and positive electrodes produced as described below to evaluate process adhesiveness of the functional layer as previously described. The result is shown in Table 1.

<Formation of Negative Electrode>

After combining 100 parts of artificial graphite as a negative electrode active material and 1 part in terms of solid content of a 2% aqueous solution of a sodium salt of carboxymethyl cellulose (MAC350HC produced by Nippon Paper Industries Co., Ltd.) as a thickener, and adjusting the solid content concentration to 68% with deionized water, mixing thereof was performed at 25° C. for 60 minutes. The mixture obtained in this manner was further adjusted to a solid content concentration of 62% through addition of deionized water and was then mixed at 25° C. for 15 minutes. Next, 1.5 parts in terms of solid content of the water dispersion containing the binder produced as described above was added to the mixture, deionized water was added to adjust the final solid content concentration to 52%, and a further 10 minutes of mixing was performed. The mixture was then subjected to a defoaming process under reduced pressure to produce a slurry composition for a negative electrode mixed material layer.

The slurry composition for a negative electrode mixed material layer obtained as described above was applied onto copper foil (current collector) of 20 μm in thickness by a comma coater such as to have a thickness of approximately 150 μm after drying. The slurry composition was dried by conveying the copper foil inside a 60° C. oven for 2 minutes at a speed of 0.5 m/min. Thereafter, heat treatment was performed at 120° C. for 2 minutes to obtain a pre-pressing negative electrode web. The pre-pressing negative electrode web was rolled by roll pressing to obtain a post-pressing negative electrode having a negative electrode mixed material layer thickness of 80 μm.

<Formation of Positive Electrode>

A slurry composition for a positive electrode was obtained by combining 100 parts of $LiCoO_2$ having a volume-average particle diameter of 12 μm as a positive electrode active material, 2 parts of acetylene black (produced by Denki Kagaku Kogyo Kabushiki Kaisha; product name: HS-100) as a conductive material, 2 parts in terms of solid content of polyvinylidene fluoride (produced by Kureha Corporation; product name: #7208) as a binder for a positive electrode, and N-methylpyrrolidone as a solvent so as to have a total solid content concentration of 70% and mixing these materials using a planetary mixer.

The obtained slurry composition for a positive electrode was applied onto aluminum foil (current collector) of 20 μm in thickness by a comma coater such as to have a thickness of approximately 150 μm after drying. The slurry composition was dried by conveying the aluminum foil inside a 60° C. oven for 2 minutes at a speed of 0.5 m/min. Thereafter, heat treatment was performed at 120° C. for 2 minutes to obtain a positive electrode web.

The resultant positive electrode web was rolled by a roll press to obtain a positive electrode including a positive electrode mixed material layer.

<Production of Lithium Ion Secondary Battery>

A rectangle of 49 cm×5 cm was cut out from the obtained post-pressing positive electrode and was placed with the surface at the positive electrode mixed material layer side thereof on top. A functional layer-equipped separator that had been cut out to 120 cm×5.5 cm was placed on the positive electrode mixed material layer such that the positive electrode was positioned at the longitudinal direction left-hand side of the functional layer-equipped separator. In addition, a rectangle of 50 cm×5.2 cm was cut out from the obtained post-pressing negative electrode and was placed on the functional layer-equipped separator such that the surface at the negative electrode mixed material layer side thereof faced toward the functional layer-equipped separator and such that the negative electrode was positioned at the longitudinal direction right-hand side of the functional layer-equipped separator. The resultant laminate was wound by a winding machine to obtain a roll. The roll was enclosed in an aluminum packing case serving as a battery case, electrolyte solution (solvent: ethylene carbonate/diethyl carbonate/vinylene carbonate=68.5/30/1.5 (volume ratio); electrolyte: $LiPF_6$ of 1 M in concentration) was injected such that no air remained, and an opening of the aluminum packing case was closed by heat sealing at 150° C. to produce a wound-type lithium ion secondary battery having a capacity of 800 mAh. This lithium ion secondary battery was used to evaluate low-temperature output characteristics and high-voltage cycle characteristics. The results are shown in Table 1.

Examples 2 and 3

A polymer A was synthesized in the same way as in Example 1 with the exception that the type and amount of each monomer used as an alkylene oxide structure-containing monomer and the amount of 2-ethylhexyl acrylate as a (meth)acrylic acid ester monomer were changed as described below in production of the polymer A. In Example 2, 6.95 g of ethoxy diethylene glycol acrylate (Light Acrylate EC-A produced by Kyoeisha Chemical Co., Ltd.; number of repetitions n: 2), which is an ethylene oxide structure-containing compound, was used as an alkylene oxide structure-containing monomer and 3.05 g of 2-ethylhexyl acrylate was used as a (meth)acrylic acid ester monomer. In Example 3, methoxy polyethylene glycol #1000 methacrylate (M-230G produced by Shin-Nakamura Chemical Co., Ltd.; number of repetitions n: 23), which is an ethylene oxide structure-containing compound, was used as an alkylene oxide structure-containing monomer. Moreover, in Example 3, the amounts of monomers used in production of the polymer A were changed such that the proportion in which each monomer unit was included in the obtained polymer A was as shown in Table 1.

The proportion in which each monomer unit was included in the obtained polymer A, the number of repetitions n of an alkylene oxide structural unit in the polymer A, the glass-transition temperature of the polymer A, and the SP value of the polymer A were measured or calculated as previously described. With the exception of the above, steps were implemented and various measurements and evaluations were performed in the same way as in Example 1. The results are shown in Table 1.

Example 4

Stearyl acrylate was used instead of 2-ethylhexyl acrylate as a (meth)acrylic acid ester monomer in production of the polymer A. Moreover, the amounts of monomers used in production of the polymer A were changed such that the proportion in which each monomer unit was included in the obtained polymer A was as shown in Table 1. With the exception of the above, the polymer A was synthesized in the same way as in Example 1. The proportion in which each monomer unit was included in the polymer A, the number of repetitions n of an alkylene oxide structural unit in the polymer A, the glass-transition temperature of the polymer A, and the SP value of the polymer A were measured as previously described. The results are shown in Table 1. With the exception of the above, steps were implemented and various measurements and evaluations were performed in the same way as in Example 1. The results are shown in Table 1.

Example 5

The amount of the polymer A used in production of the composition for a functional layer was changed as shown in Table 1. Moreover, 95 parts of alumina (produced by Sumitomo Chemical Co., Ltd.; product name: AKP3000; volume-average particle diameter: 300 nm) as inorganic particles was used instead of the organic particles as non-conductive particles. With the exception of the above, steps were implemented and various measurements and evaluations were performed in the same way as in Example 1. The results are shown in Table 1.

Example 6

The amounts of the polymer A and non-conductive particles used in production of the composition for a functional layer were changed as shown in Table 1. Moreover, a mixture of the same organic particles as in Example 1 and the same alumina as in Example 5 was used as non-conductive particles. The proportion constituted by the organic particles among the entire mixture of the organic particles and the inorganic particles used as non-conductive particles was 30 volume %. With the exception of the above, steps were implemented and various measurements and evaluations were performed in the same way as in Example 1. The results are shown in Table 1.

Example 7

A composition for a functional layer produced as described below was applied onto a negative electrode including a negative electrode mixed material layer formed in the same way as in Example 1 so as to form a negative electrode including "another functional layer" at the outermost surface thereof. In other words, in this example, a functional layer that was "another functional layer" containing neither non-conductive particles nor an electrode active material and that functioned to improve electrochemical characteristics of an electrochemical device was formed at the negative electrode side. Moreover, an adhesive layer-equipped separator including an adhesive layer formed as described below at both sides was used as a separator. With the exception of the above, steps were implemented in the same way as in Example 1, and in a step of producing a lithium ion secondary battery, a wound-type lithium ion secondary battery was produced by forming a roll having a layered structure with a stacking order of: current collector/negative electrode mixed material layer/functional layer (other functional layer)/adhesive layer-equipped separator/positive electrode mixed material layer/current collector. The same measurements and evaluations as in Example 1 were performed. The results are shown in Table 1. Note that process adhesiveness was not evaluated in this example because adhesiveness between battery components was ensured through the adhesive layer-equipped separator.

<Production of Composition for Electrochemical Device Functional Layer>

A mixture was obtained by mixing 99 parts by mass of the same polymer A as in Example 1 and a water dispersion containing 1 part in terms of solid content of the same binder (SBR copolymer) as in Example 1. The mixture was diluted to a solid content concentration of 10% with deionized water to obtain a composition for a functional layer.

<Formation of Adhesive Layer-Equipped Separator>

A composition for an adhesive layer was obtained by mixing a water dispersion containing 100 parts in terms of solid content of organic particles produced in the same way as in Example 1 and a water dispersion containing 25 parts in terms of solid content of a binder produced in the same way as in Example 1, and then diluting these materials to a solid content concentration of 10% with deionized water. The composition for an adhesive layer obtained as described above was applied onto both sides of a separator made from polypropylene (Celgard 2500 produced by Celgard, LLC.) as a substrate and was dried at 50° C. for 3 minutes. In this manner, an adhesive layer-equipped separator was obtained that included, at both sides, an adhesive layer having a thickness of 1 μm at each side.

Example 8

A negative electrode formed as described below was used. Specifically, a composition for a functional layer was compounded and used in a slurry composition for a negative electrode mixed material layer, and a lithium ion secondary battery including a negative electrode mixed material layer as the presently disclosed functional layer was produced in this example. Moreover, an adhesive layer-equipped separator formed in the same way as in Example 7 was used as a separator. With the exception of the above, steps were implemented in the same way as in Example 1, and in a step of producing a lithium ion secondary battery, a wound-type lithium ion secondary battery was produced by forming a roll having a layered structure with a stacking order of: current collector/functional layer (negative electrode mixed material layer)/adhesive layer-equipped separator/positive electrode mixed material layer/current collector. The same measurements and evaluations as in Example 1 were performed. The results are shown in Table 1. Note that process adhesiveness was not evaluated in this example because adhesiveness between battery components was ensured through the adhesive layer-equipped separator.

<Formation of Negative Electrode>

A slurry composition for a negative electrode mixed material layer was produced in the same way as in Example 1 with the exception that 3 parts of the same polymer A as in Example 1 was compounded per 100 parts of the negative electrode active material in production of the slurry composition for a negative electrode mixed material layer. A negative electrode was then formed in the same way as in Example 1.

Example 9

A composition for a functional layer produced as described below was applied onto a positive electrode including a positive electrode mixed material layer formed in the same way as in Example 1 so as to form a positive electrode including "another functional layer" at the outermost surface thereof. In other words, in this example, a functional layer that was "another functional layer" containing neither non-conductive particles nor an electrode active material and that functioned to improve electrochemical characteristics of an electrochemical device was formed at the positive electrode side. Moreover, an adhesive layer-equipped separator formed in the same way as in Example 7 was used as a separator. With the exception of the above, steps were implemented in the same way as in Example 1, and in a step of producing a lithium ion secondary battery, a wound-type lithium ion secondary battery was produced by forming a roll having a layered structure with a stacking order of: current collector/negative electrode mixed material layer/adhesive layer-equipped separator/functional layer (other functional layer)/positive electrode mixed material layer/current collector. The same measurements and evaluations as in Example 1 were performed. The results are shown in Table 1. Note that process adhesiveness was not evaluated in this example because adhesiveness between battery components was ensured through the adhesive layer-equipped separator.

<Production of Composition for Electrochemical Device Functional Layer>

A composition for a functional layer was obtained by adding 99 parts by mass of the same polymer A as in Example 1 and 1 part in terms of solid content of polyvinylidene fluoride (produced by Kureha Corporation; product name: #7208) as a binder to NMP as a solvent such that the solid content concentration was 10%.

Example 10

Steps were implemented and various measurements and evaluations were performed in the same way as in Example 1 with the exception that a polyvinylidene fluoride-hexafluoropropylene copolymer (produced by Sigma-Aldrich Corporation), which is a fluoropolymer, was used instead of the particulate polymer having a core-shell structure as non-conductive particles in production of the composition for a functional layer. The results are shown in Table 1. The degree of swelling in electrolyte solution of the polyvinylidene fluoride-hexafluoropropylene copolymer, measured as previously described, was 200%.

Example 11

Polypropylene glycol monoacrylate (BLEMMER AP Series AP-800 produced by NOF Corporation; number of repetitions n: 13), which is a propylene oxide structure-containing compound, was used as an alkylene oxide structure-containing monomer in production of the polymer A. Moreover, the amounts of monomers used in production of the polymer A were changed such that the proportion in which each monomer unit was included in the obtained polymer A was as shown in Table 1. The proportion in which each monomer unit was included in the polymer A, the number of repetitions n of an alkylene oxide structural unit in the polymer A, the glass-transition temperature of the polymer A, and the SP value of the polymer A were measured or calculated as previously described. The results are shown in Table 1.

Steps were implemented and various measurements and evaluations were performed in the same way as in Example 1 with the exception that the polymer A obtained as described above was used. The results are shown in Table 1.

Examples 12 and 13

The amounts of monomers used in production of the polymer A were changed such that the proportion in which each monomer unit was included in the obtained polymer A was as shown in Table 1. The proportion in which each monomer unit was included in the obtained polymer A, the number of repetitions n of an alkylene oxide structural unit in the polymer A, the glass-transition temperature of the polymer A, and the SP value of the polymer A were measured or calculated as previously described. With the exception of the above, steps were implemented and various measurements and evaluations were performed in the same way as in Example 1. The results are shown in Table 1.

Comparative Example 1

Polyethylene oxide (ALKOX R-1000 produced by Meisei Chemical Works, Ltd.; weight-average molecular weight: 259,000) was used as a polymer B. The proportion in which a monomer unit was included in the polymer B, the glass-transition temperature of the polymer B, and the SP value of the polymer B were measured or calculated as previously described. The results are shown in Table 1.

Steps were implemented and various measurements and evaluations were performed in the same way as in Example 1 with the exception that the polymer B obtained as described above was used. The results are shown in Table 1.

Comparative Example 2

A polymer C obtained through polymerization of 2-ethylhexyl acrylate, which is a (meth)acrylic acid ester monomer, was used instead of the polymer A. The polymerization conditions of the polymer C were as described below. The glass-transition temperature and the SP value of the polymer C were measured or calculated as previously described. Steps were implemented and various measurements and evaluations were performed in the same way as in Example 1 with the exception that the polymer C was used instead of the polymer A. The results are shown in Table 1.

<Production of polymer C>

A 5 MPa pressure vessel equipped with a stirrer was charged with 99 parts of 2-ethylhexyl acrylate, 1 part of methacrylic acid as an acid group-containing monomer, 1 part of sodium dodecylbenzenesulfonate as an emulsifier, 150 parts of deionized water, and 0.5 parts of potassium persulfate as a polymerization initiator. These materials were sufficiently stirred and were then heated to 80° C. to initiate polymerization. The reaction was terminated by cooling at the point at which the polymerization conversion rate reached 96% to yield the polymer C.

In Table 1, shown below:
"EO" indicates ethylene oxide structure-containing monomer unit;
"2EHA" indicates 2-ethylhexyl acrylate unit;
"SBR" indicates styrene-butadiene copolymer;
"SA" indicates stearyl acrylate unit;
"PVDF" indicates polyvinylidene fluoride;
"NMP" indicates N-methylpyrrolidone;
"PVDF-HFP" indicates polyvinylidene fluoride-hexafluoropropylene copolymer; and
"PO" indicates propylene oxide structure-containing monomer unit.

TABLE 1

| | | | | Examples | | | |
|---|---|---|---|---|---|---|---|
| | | | | 1 | 2 | 3 | 4 |
| Composition for electrochemical device functional layer | Polymer | Type | | Polymer A | Polymer A | Polymer A | Polymer A |
| | | Alkylene oxide structure-containing monomer unit | Type | EO | EO | EO | EO |
| | | | No. of repetitions n(—) | 13 | 2 | 23 | 13 |
| | | | Proportion (mol %) | 30 | 30 | 30 | 30 |
| | | (Meth)acrylic acid ester monomer unit | Type | 2EHA | 2EHA | 2EHA | SA |
| | | | Alkyl group carbon number (no. of atoms) | 8 | 8 | 8 | 18 |
| | | | Proportion (mol %) | 70 | 70 | 70 | 70 |
| | | Glass-transition temperature (° C.) | | −65 | −62 | −68 | −27 |
| | | SP value (—) | | 19.06 | 19.32 | 19.01 | 18.68 |
| | | Additive amount | When containing non-conductive particles (mass %; relative to total amount with non-conductive particles) | 10 | 10 | 10 | 10 |
| | | | When containing electrode active material (parts by mass; relative to 100 parts by mass of electrode active material) | — | — | — | — |
| | | | When not containing non-conductive particles and electrode active material (mass %; relative to total amount with other polymer) | — | — | — | — |

TABLE 1-continued

|  |  |  |  |  |  |  |  |
|---|---|---|---|---|---|---|---|
|  | Non-conductive particles (functional particles) | Inorganic particles | Type | — | — | — | — |
|  |  | Organic particles | Type | Core-shell | Core-shell | Core-shell | Core-shell |
|  |  |  | Volume-average particle diameter (nm) | 450 | 450 | 450 | 450 |
|  |  | Ratio of organic particles (vol %; relative to all non-conductive particles) |  | 100 | 100 | 100 | 100 |
|  |  | Additive amount (mass %; relative to total amount with polymer) |  | 90 | 90 | 90 | 90 |
|  | Other polymer (binder) | Type |  | SBR | SBR | SBR | SBR |
|  |  | Volume-average particle diameter (nm) |  | 130 | 130 | 130 | 130 |
|  | Solvent | Type |  | Water | Water | Water | Water |
| Functional layer formation location | Type |  |  | Separator | Separator | Separator | Separator |
| Evaluations | Low-temperature output characteristics |  |  | A | B | A | B |
|  | High-voltage cycling |  |  | A | A | B | A |
|  | Process adhesiveness |  |  | A | A | A | A |

|  |  |  |  | Examples |  |  |
|---|---|---|---|---|---|---|
|  |  |  |  | 5 | 6 | 7 |
| Composition for electrochemical device functional layer | Polymer | Type |  | Polymer A | Polymer A | Polymer A |
|  |  | Alkylene oxide structure-containing monomer unit | Type | EO | EO | EO |
|  |  |  | No. of repetitions n(—) | 13 | 13 | 13 |
|  |  |  | Proportion (mol %) | 30 | 30 | 30 |
|  |  | (Meth)acrylic acid ester monomer unit | Type | 2EHA | 2EHA | 2EHA |
|  |  |  | Alkyl group carbon number (no. of atoms) | 8 | 8 | 8 |
|  |  |  | Proportion (mol %) | 70 | 70 | 70 |
|  |  | Glass-transition temperature (° C.) |  | −65 | −65 | −65 |
|  |  | SP value (—) |  | 19.06 | 19.06 | 19.06 |
|  |  | Additive amount | When containing non-conductive particles (mass %; relative to total amount with non-conductive particles) | 5 | 8 | — |
|  |  |  | When containing electrode active material (parts by mass; relative to 100 parts by mass of electrode active material) | — | — | — |
|  |  |  | When not containing non-conductive particles and electrode active material (mass %; relative to total amount with other polymer) | — | — | 99 |
|  | Non-conductive particles (functional particles) | Inorganic particles | Type | Alumina | Alumina | — |
|  |  | Organic particles | Type | — | Core-shell | — |
|  |  |  | Volume-average particle diameter (nm) | — | 450 | — |
|  |  | Ratio of organic particles (vol %; relative to all non-conductive particles) |  | 0 | 30 | — |
|  |  | Additive amount (mass %; relative to total amount with polymer) |  | 95 | 92 | — |
|  | Other polymer (binder) | Type |  | SBR | SBR | SBR |
|  |  | Volume-average particle diameter (nm) |  | 130 | 130 | 130 |
|  | Solvent | Type |  | Water | Water | Water |
| Functional layer formation location | Type |  |  | Separator | Separator | On negative electrode |
| Evaluations | Low-temperature output characteristics |  |  | A | A | A |
|  | High-voltage cycling |  |  | A | A | A |
|  | Process adhesiveness |  |  | C | B | — |

|  |  |  |  | Examples |  |  |  |
|---|---|---|---|---|---|---|---|
|  |  |  |  | 8 | 9 | 10 | 11 |
| Composition for electrochemical device functional layer | Polymer | Type |  | Polymer A | Polymer A | Polymer A | Polymer A |
|  |  | Alkylene oxide structure-containing monomer unit | Type | EO | EO | EO | PO |
|  |  |  | No. of repetitions n(—) | 13 | 13 | 13 | 13 |
|  |  |  | Proportion (mol %) | 30 | 30 | 30 | 30 |
|  |  | (Meth)acrylic acid ester monomer unit | Type | 2EHA | 2EHA | 2EHA | 2EHA |
|  |  |  | Alkyl group carbon number (no. of atoms) | 8 | 8 | 8 | 8 |
|  |  |  | Proportion (mol %) | 70 | 70 | 70 | 70 |

TABLE 1-continued

|  |  |  |  |  |  |  |  |
|---|---|---|---|---|---|---|---|
|  |  |  | Glass-transition temperature (° C.) | −65 | −65 | −65 | −66 |
|  |  |  | SP value (—) | 19.06 | 19.06 | 19.06 | 18.9 |
|  |  |  | Additive amount | When containing non-conductive particles (mass %; relative to total amount with non-conductive particles) | — | — | 10 | 10 |
|  |  |  |  | When containing electrode active material (parts by mass; relative to 100 parts by mass of electrode active material) | — | — | — | — |
|  |  |  |  | When not containing non-conductive particles and electrode active material (mass %; relative to total amount with other polymer) | — | 99 | — | — |
|  | Non-conductive particles (functional particles) | Inorganic particles | Type | — | — | — | — |
|  |  | Organic particles | Type | — | — | PVdF-HFP | Core-shell |
|  |  |  | Volume-average particle diameter (nm) | — | — | 300 | 450 |
|  |  | Ratio of organic particles (vol %; relative to all non-conductive particles) |  | — | — | 100 | 100 |
|  |  | Additive amount (mass %; relative to total amount with polymer) |  | — | — | 90 | 90 |
|  | Other polymer (binder) | Type |  | SBR | PVdF | SBR | SBR |
|  |  | Volume-average particle diameter (nm) |  | 130 | — | 130 | 130 |
|  | Solvent | Type |  | Water | NMP | Water | Water |
| Functional layer formation location | Type |  |  | In negative electrode | On positive electrode | Separator | Separator |
| Evaluations | Low-temperature output characteristics |  |  | A | A | A | B |
|  | High-voltage cycling |  |  | A | B | A | A |
|  | Process adhesiveness |  |  | — | — | B | A |

|  |  |  |  | Examples | | Comparative examples | |
|---|---|---|---|---|---|---|---|
|  |  |  |  | 12 | 13 | 1 | 2 |
| Composition for electrochemical device functional layer | Polymer | Type |  | Polymer A | Polymer A | Polymer B | Polymer C |
|  |  | Alkylene oxide structure-containing monomer unit | Type | EO | EO | EO | — |
|  |  |  | No. of repetitions n(—) | 13 | 13 | — | — |
|  |  |  | Proportion (mol %) | 90 | 15 | 100 | — |
|  |  | (Meth)acrylic acid ester monomer unit | Type | 2EHA | 2EHA | — | 2EHA |
|  |  |  | Alkyl group carbon number (no. of atoms) | 8 | 8 | — | 8 |
|  |  |  | Proportion (mol %) | 10 | 85 | 0 | 100 |
|  |  | Glass-transition temperature (° C.) |  | −65 | −65 | −65 | −65 |
|  |  | SP value (—) |  | 19.43 | 18.96 | 24.04 | 18.87 |
|  |  | Additive amount | When containing non-conductive particles (mass %; relative to total amount with non-conductive particles) | 10 | 10 | 10 | 10 |
|  |  |  | When containing electrode active material (parts by mass; relative to 100 parts by mass of electrode active material) | — | — | — | — |
|  |  |  | When not containing non-conductive particles and electrode active material (mass %; relative to total amount with other polymer) | — | — | — | — |
|  | Non-conductive particles (functional particles) | Inorganic particles | Type | — | — | — | — |
|  |  | Organic particles | Type | Core-shell | Core-shell | Core-shell | Core-shell |
|  |  |  | Volume-average particle diameter (nm) | 450 | 450 | 450 | 450 |
|  |  | Ratio of organic particles (vol %; relative to all non-conductive particles) |  | 100 | 100 | 100 | 100 |
|  |  | Additive amount (mass %; relative to total amount with polymer) |  | 90 | 90 | 90 | 90 |
|  | Other polymer (binder) | Type |  | SBR | SBR | SBR | SBR |
|  |  | Volume-average particle diameter (nm) |  | 130 | 130 | 130 | 130 |
|  | Solvent | Type |  | Water | Water | Water | Water |

TABLE 1-continued

| Functional layer formation location | Type | | Separator | Separator | Separator | Separator |
|---|---|---|---|---|---|---|
| Evaluations | Low-temperature output characteristics | | A | B | B | D |
| | High-voltage cycling | | B | A | C | A |
| | Process adhesiveness | | A | A | A | A |

It can be seen from Table 1 that is was possible to form a functional layer that could provide an electrochemical device with good low-temperature output characteristics and high-voltage cycle characteristics in Examples 1 to 13 in which the used composition for a functional layer contained a polymer A including an alkylene oxide structure-containing monomer unit and a (meth)acrylic acid ester monomer unit. It can also be seen from Table 1 that it was not possible to form a functional layer that could provide an electrochemical device with good low-temperature output characteristics and high-voltage cycle characteristics in Comparative Examples 1 and 2 in which a polymer B that included an alkylene oxide structure-containing monomer unit in a proportion of 100 mol % and did not include a (meth)acrylic acid ester monomer unit or a polymer C that did not include an alkylene oxide structure-containing monomer unit was used.

INDUSTRIAL APPLICABILITY

According to the present disclosure, it is possible to provide a composition for an electrochemical device functional layer with which it is possible to form a functional layer that can improve low-temperature output characteristics and high-voltage cycle characteristics of an electrochemical device.

Moreover, according to the present disclosure, it is possible to provide a functional layer for an electrochemical device that can improve low-temperature output characteristics and high-voltage cycle characteristics of an electrochemical device.

Furthermore, according to the present disclosure, it is possible to provide an electrochemical device having excellent electrochemical characteristics such as low-temperature output characteristics and high-voltage cycle characteristics.

The invention claimed is:

1. A composition for an electrochemical device functional layer comprising a polymer A, non-conductive particles, and a solvent, wherein
the polymer A includes an alkylene oxide structure-containing monomer unit and a (meth)acrylic acid ester monomer unit,
the polymer A includes the alkylene oxide structure-containing monomer unit in a proportion of 25 mol % or more and the (meth)acrylic acid ester monomer unit in a proportion of not less than 70 mol %,
an amount of the non-conductive particles in the composition when the total amount of the non-conductive particles and the polymer A is taken to be 100 mass % is 50 mass % or more,
the non-conductive particles include a particulate polymer having a core-shell structure including a core potion and a shell portion at least partially covering an outer surface of the core portion, and
the core portion comprises a polymer formed through polymerization of a (meth)acrylic acid ester monomer unit and a (meth)acrylonitrile unit, and a total proportion of the (meth)acrylic acid ester monomer unit and the (meth)acrylonitrile unit in the polymer forming the core portion is more than 50 mass % relative to a total weight of the polymer.

2. The composition for an electrochemical device functional layer according to claim 1, wherein the (meth)acrylic acid ester monomer unit of the polymer A includes a (meth)acrylic acid alkyl ester monomer unit, and an alkyl group bonded to a non-carbonyl oxygen atom in the (meth)acrylic acid alkyl ester monomer unit is a linear or branched alkyl group having a carbon number of not less than 5 and not more than 20.

3. The composition for an electrochemical device functional layer according to claim 1, wherein the alkylene oxide structure-containing monomer unit of the polymer A includes a polyalkylene oxide structure in which an alkylene oxide structural unit is repeated n times, where n is an integer of not less than 2 and not more than 30.

4. The composition for an electrochemical device functional layer according to claim 1, wherein the alkylene oxide structure-containing monomer unit of the polymer A includes either or both of an ethylene oxide structure-containing monomer unit and a propylene oxide structure-containing monomer unit.

5. A functional layer for an electrochemical device formed using the composition for an electrochemical device functional layer according to claim 1.

6. An electrochemical device comprising the functional layer for an electrochemical device according to claim 5.

7. The composition for an electrochemical device functional layer according to claim 1, wherein the non-conductive particles include inorganic particles.

* * * * *